Patented Jan. 19, 1932

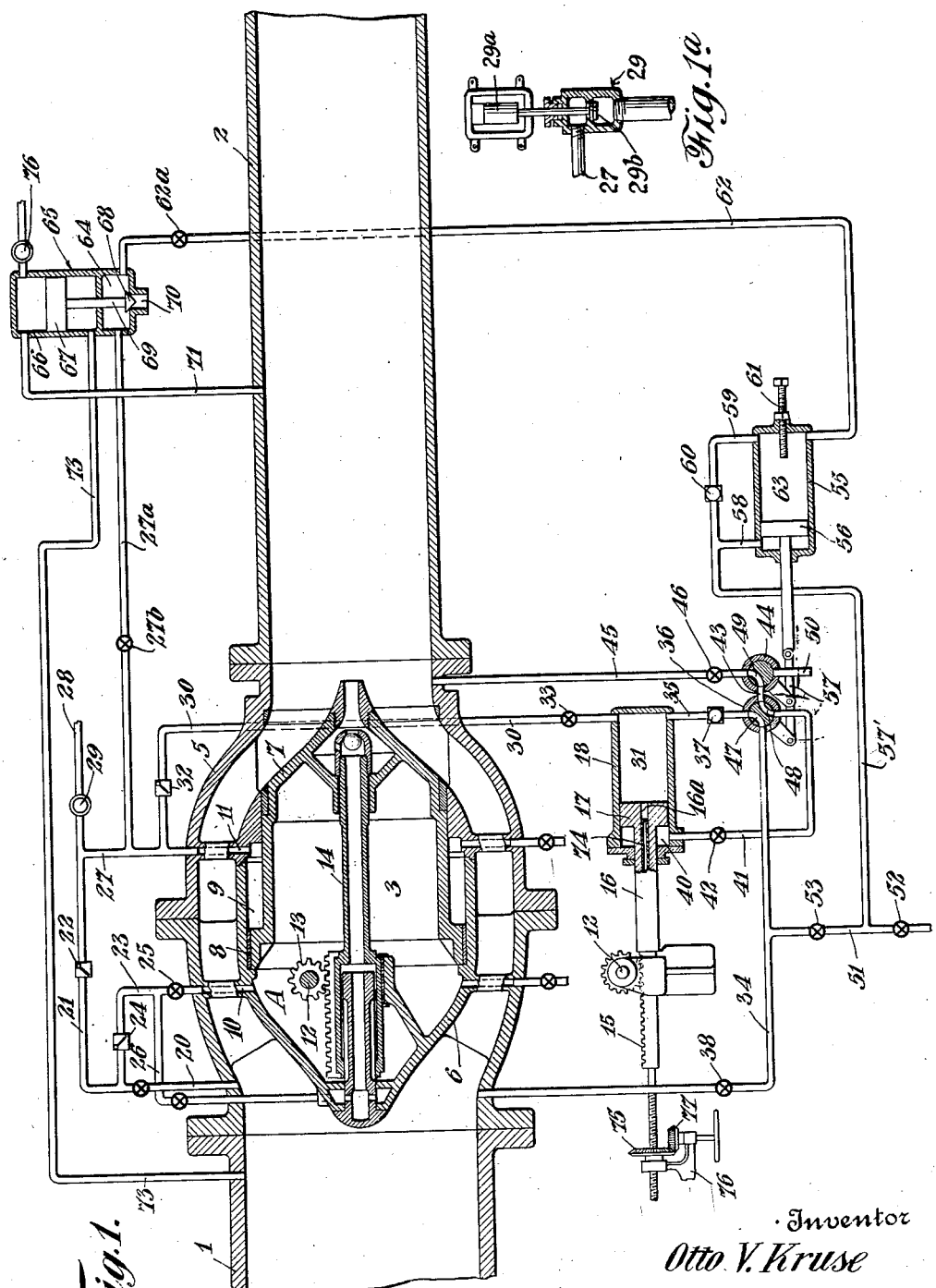

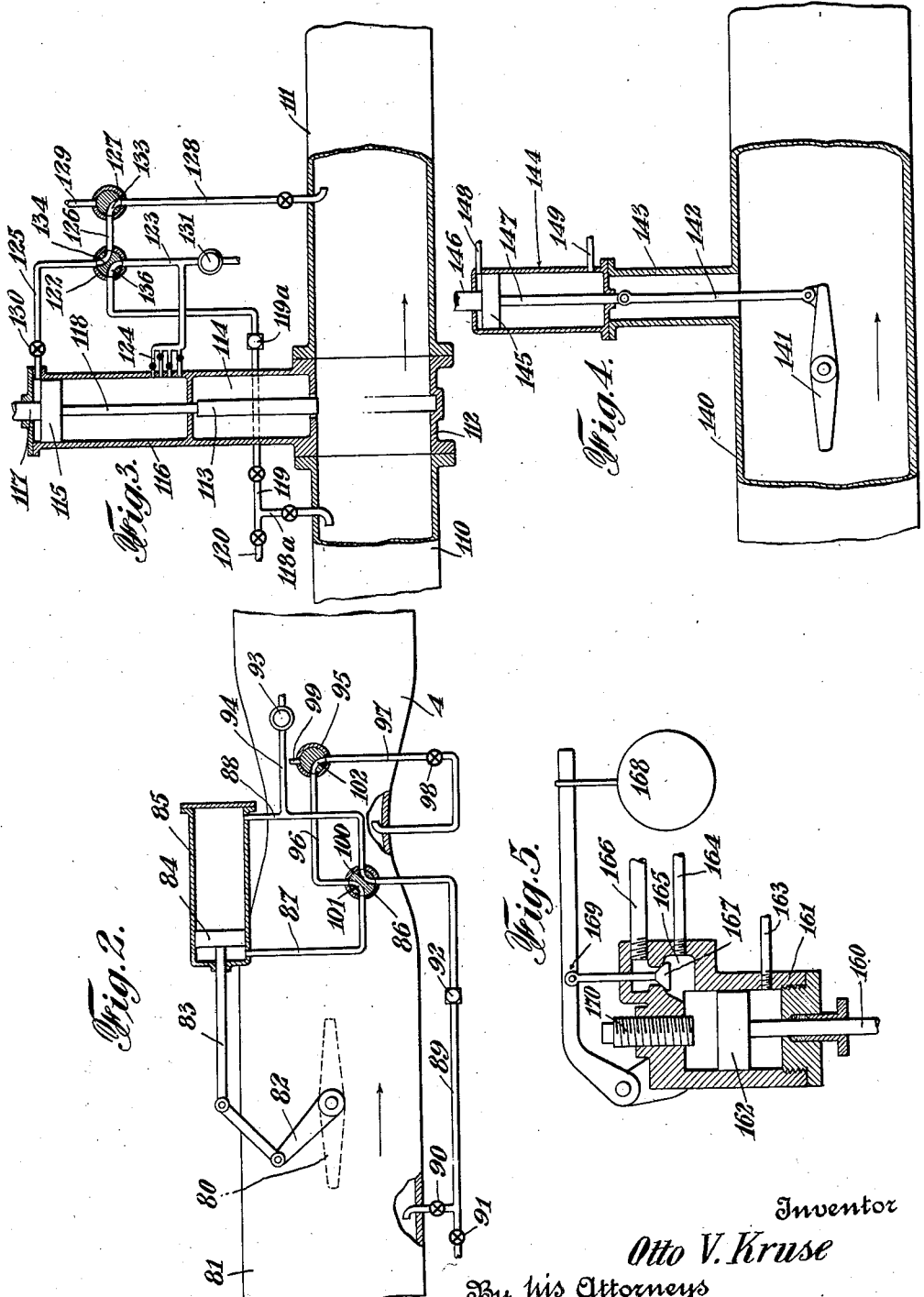

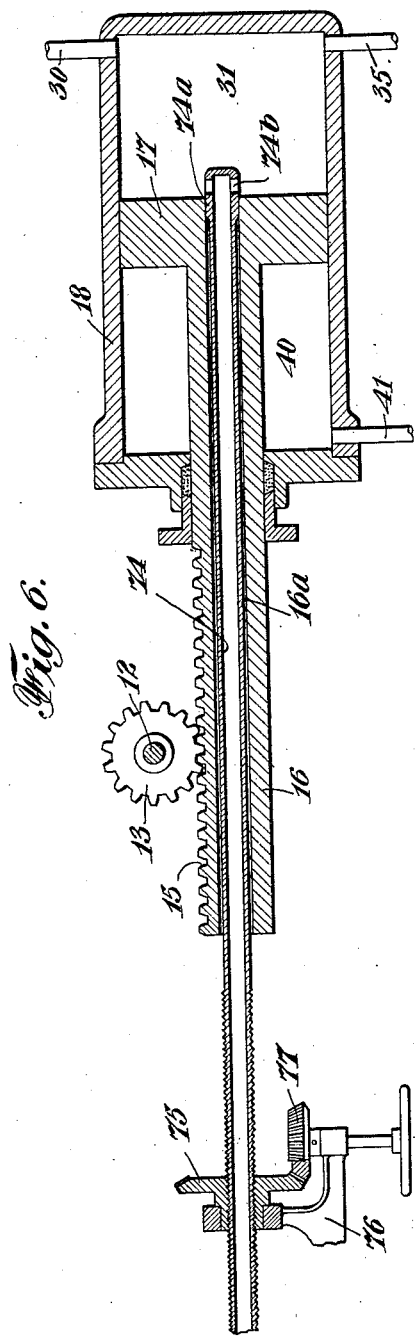
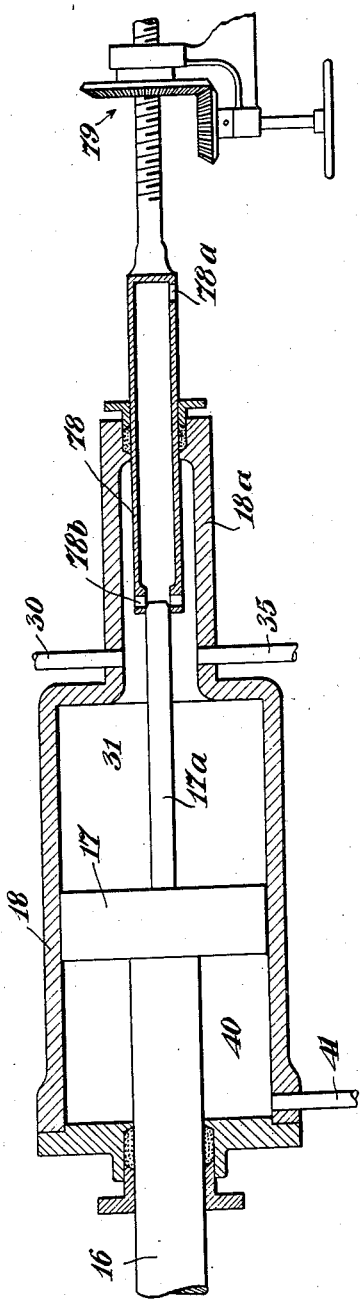

1,841,608

UNITED STATES PATENT OFFICE

OTTO V. KRUSE, OF ST. DAVIDS, PENNSYLVANIA, ASSIGNOR, BY MESNE ASSIGNMENTS, TO I. P. MORRIS CORPORATION, A CORPORATION OF DELAWARE

CHECK VALVE

Application filed December 7, 1925. Serial No. 73,614.

This invention relates to valve mechanisms and more particularly to controlling means therefor.

When fluid flow in hydraulic pipe lines is interrupted it is desirable in order to prevent back flow to close a main valve automatically. In other instances, it is desirable to open the valve automatically upon restoration of the hydraulic pressure in the line. One example of such an installation is where a centrifugal pump might be used to create a flow through the pipe line and if for any reason the pump should stop, the main valve will be closed and upon restarting of the pump, whereby pressure will be built up in the pipe line between the main valve and the pump, the valve will be opened. Accordingly, an object of my invention is to control a valve automatically in accordance with different pressure conditions co-existing on each side of the main valve, and particularly to close the valve automatically to prevent back flow and at a later period to reopen the valve.

A further object is to provide a fluid pressure means of beginning the closing movement before reversal of flow takes place and effect automatic reopening through the same element without any intermediate manipulation or settings of the control.

A further object of my invention is to close the valve automatically in case fluid flow through the valve should exceed a predetermined amount. Such a condition could be brought about as by breakage in the pipe or any other well-known conditions. After normal conditions are restored so that the flow through the valve can be reestablished in normal or less than normal amounts, the valve will automatically open to allow communication between the upstream and downstream sides of the pipe line.

It is a further object to provide means whereby when desired the plunger valve may be used as a throttle valve. Another object is to provide improved means for controlling the plunger under throttling conditions. A further object is to provide an improved arrangement whereby the throttle control means may be used in conjunction with the other controlling mechanisms. It is a further object of my invention to control the automatic closing and opening functions by the pressures existing within the pipe line.

With the foregoing and other objects in view, my invention consists in certain other novel features of construction and arrangement of parts which are more fully described and illustrated in the accompanying drawings, in which Fig. 1 is a fragmentary partial sectional view of the valve mechanism and semi-diagrammatic view of the controlling mechanism therefor;

Fig. 1—A, is a sectional view of a solenoid operated blow-off valve.

Fig. 2 is a fragmentary partial sectional view of a modified form of valve and controlling means;

Fig. 3 is a further modified view showing a reciprocal gate valve and controlling means therefor;

Fig. 4 is a further modification showing a different type of pivot valve operating means;

Fig. 5 is a vertical sectional view of a modified form of valve operating means.

Fig. 6 is an enlarged central detail of the throttle control disposed in a position to permit closing movement of the plunger valve.

Fig. 7 is a modified form of the throttle controlling means.

In the illustrative embodiment of my invention, I have shown an upstream pipe 1 adapted to have communication with a downstream pipe 2 as by a valve mechanism, generally indicated 3. The valve 3 in a preferred form is of the well-known Johnson type and its specific construction is identical to the valve mechanism disclosed in my copending application, Serial No. 532,100, filed January 27, 1922. This valve comprises generally a housing 5 carrying a combined plunger guide and chamber forming member 6. An annular passage-way is thus formed between outer and inner casings 5 and 6. A plunger 7 is slidably guided by the front end of the member 6 and has at its rear end an annular flange 8 forming a piston-like element which is slidable and forms an annular chamber 9. The various parts mentioned form an inner chamber A which has communication with the exterior as through a passage 10 while the chamber 9 has exterior communication as through a passage 11. In order to move the plunger valve 7 a shaft 12 extending through the casing 6 and 5 carries a pinion 13 which meshes with a rack formed on a movable stem 14. The outer end of the shaft 12 carries a pinion which meshes with a rack 15 formed on the outer end of a piston rod 16 which carries a piston 17. The piston 17 is disposed within a cylinder 18 carried on the side of the casing 5 and upon reciprocation of the piston will cause rotation of the pinion 12 and accordingly the stem 14 thereby causing movement of the plunger 7 as described in my co-pending application. Fluid flow to the chambers A and 9 is so controlled as to facilitate movement of the plunger valve 7 by the piston 17.

The mechanism for controlling the opening and closing of the plunger valve 7 automatically, in accordance with differential pressure conditions in the pipe line, comprises a pipe 20 communicating with the pipe line 1 at a point adjacent the rear end of the valve housing 6. This pipe communicates with a pipe 21 which has a check valve 22 therein and with a pipe 23 that communicates with the chamber A as through the passage 10. A check valve 24 and hand valve 25 are disposed in the pipe 23 while a valve controlled pipe 26 allows communication between the passage in movable stem 14 and pipe 23. The pipe 21 communicates with a pipe 27 that leads to the passage 11 while a branch pipe 28 provided with a blow off valve 29 leads to a suitable drain. The blow off valve could be of any suitable electrical, mechanical or hydraulic construction so that when pressure or flow conditions existed in the pipe line sufficient to warrant closure of the main valve, the pipe 27 would be vented to the drain. To control operation of the piston 17 a pipe 30 allows communication between the cylinder chamber 31 and the pipe 27, a check valve 32 and hand valve 33 being disposed in the line 30. One form of electrically controlled blow-off valve is shown in Fig. 1—A, wherein a solenoid 29—A, which may be energized by current delivered to the electric motor for driving the pump which creates flow through the pipe line, is adapted when energized to hold the valve 29—B closed, whereby the valve will open upon failure of the current to the driving motor.

Fluid flow in the piping just described is controlled by the piping now to be described. This comprises a pipe 34 having communication with the interior of the valve housing 5 substantially in the same plane as pipe 20 and has communication at its other end as through a pipe 35 and a valve mechanism 36 with the cylinder chamber 31, a throttle valve 37 being disposed in the line 35 while the hand valve 38 is disposed in the line 34. To control the flow of fluid to the chamber 40 of the cylinder 18 there is provided a pipe 41 having a hand valve 42 and which communicates with the pipe line at a point substantially adjacent the main valve seat but in front thereof. This communication is effected by the pipe 41 being connected to the valve 36 which in turn is connected to a pipe 43, a valve 44 and pipe 45 which has a suitable hand valve 46 therein. It will be noted that the valve 36 is a four-way valve having two opposed arcuate passages 47 and 48 while the valve 44 has a single passage 49 adapted to allow communication between the pipes 43 and 45 and a piping 50 which leads to a suitable drain. A pipe 51 may be provided so as to supply an exterior source of pressure to the motor cylinder 18, this pipe having suitable hand control valves 52 and 53 and communicating with the pipe 34.

The mechanism so far described is capable of opening or closing the valve automatically in accordance with decreasing or increasing pressure conditions in the pipe 1 and during which period a full pressure head will be maintained in the pipe 2. The operation of this form is as follows. With the valves 36 and 44 in the position as shown and the plunger valve 7 open, water may flow under full pressure from the pipe 1 to the pipe 2, thus creating suitable pressure which will be transmitted through the pipes 20, 23 and passage 10 to the chamber A. Pressure will also be transmitted through pipe 34, valve passage 47, throttle valve 37 and pipe 35 to the cylinder chamber 31, thereby holding the piston 17 in its left hand position and accordingly the valve 7 in open position. Pressure will also be transmitted from the cylinder chamber 31 through the pipe 30, check valve 32, pipe 27 and passage 11 to the chamber 9 thereby maintaining the plunger valve 7 in a substantially balanced condition. Fluid pressure also exists in the chamber 40 on the left hand side of the piston 17 as by having the chamber in communication with the pipe 2 such as through pipe 41, valve passage 48, pipe 43, valve passage 49 and pipe 45. Thus the piston 17 has full line pressure on both sides thereof but due to the difference in effective area on each of the piston sides, caused by the piston rod 16, the piston will be held in a left hand position and accordingly hold the valve 7 open.

If for some reason pressure in the pipe 1 could not be maintained such as for example the stopping of a motor driven pump due to a power interruption, the blow off valve 29 would be opened by a solenoid the power supply to which would be interrupted simultaneously with the power supply to the pump, thereby releasing the pressure in the chamber 9. Simultaneously with the release of pressure in chamber 9, pressure in the cylinder chamber 31 will be reduced as through the pipe 30 which has communication with the pipe 27.

The supply of pressure through pipes 34 and 35 to chamber 31 is restricted by throttle valve 37 so that the drop of pressure in chamber 31 takes place through pipe 30 even during continued fluid supply. Under these conditions plunger 7 closes on account of the drop of pressure in chambers 9 and 31 and a supply of pressure to cylinder chamber 40 which causes movement of piston 17, and, as described in said co-pending application, a supply of pressure created by water in pipe 2 is transmitted through the passage in rod 14 to chamber A. Movement of piston 17 is adapted to move plunger 7 by the pinion 13 and its cooperating rack. It will be noted that check valve 22 prevents a supply of pressure to pipe 27 when blow off valve 29 is opened. Likewise check valve 24 prevents discharge of pressure from chamber A to pipe 1 after the pressure in pipe 1 has been reduced.

A drop of pressure in chamber 31 is not essential to closure as the drop in chamber 9 is more than enough to close the plunger 7 and in addition overcome the exposed area of stem 16.

With the valve in closed position pressure in the line 1 may be reduced to a minimum but upon restarting of the pump which will close solenoid valve 29 and also restore normal pressure in pipe 1 fluid will flow through the pipe 34, valve passage 47 and pipe 35 to the cylinder chamber 31 thereby moving the piston 17 in a left hand direction to reopen the valve 7. This piston movement is effected in spite of the pressure existing in the chamber 40 due to the effective area on the left hand side of the piston 17 being reduced by the piston rod 16. Simultaneously with the fluid flow to the chamber 31 fluid will flow through pipe 30 and pipe 27 to passage 11 and chamber 9 thereby equalizing the pressure on the plunger valve 7. Thus it will be seen that the valve opens automatically in accordance with the restoration of pressure in the upstream side of the pipe line.

To close the main valve automatically in accordance with an increase of the velocity of flow above normal, there is provided suitable means for controlling the valves 36 and 44. This means comprises a motor cylinder 55 having a piston 56 disposed therein which is provided with a piston rod in turn connected by suitable linkages 57 to the valves 36 and 44. These valves will thereby be operated simultaneously and the piston stroke is limited to impart 90° of rotation to the valves. The means for controlling the fluid which actuates the piston 56 comprises a pipe 57' having communication at one end with the pipe 51 and at its other end with branch pipes 58 and 59 between which a throttle valve 60 is disposed. A suitable adjustable stem 61 is provided in the rear cylinder head of the motor 55 to limit the stroke of the piston 56. The means for initially controlling movement of the piston 56 in accordance with an increase of flow through valve 3 comprises a pipe 62 having communication with cylinder chamber 63 and with a chamber 64 of a blow off valve 65. A cylinder 66 has a piston 67 disposed therein which is provided with a valve 68 mounted on the end of piston rod 69, this valve controlling a drain passage 70 leading from the chamber 64. To control movement of piston 67 a pipe 71 has communication with pipe 2 and with the upper end of cylinder 66 while pipe 73 communicates respectively with the lower end of cylinder 66 and with pipe 1. A blow or valve 76 has communication with cylinder 66.

Assuming valve 3 to be open and the controlling valve mechanisms and actuating motors in the position as shown in Fig. 1, when for any reason the velocity of flow through valve 3 exceeds a predetermined normal, a reduced pressure will be created in the upper end of the cylinder 66, due to pressure in the pipe 2 dropping faster than in pipe 1, and accordingly pressure communicated through pipe 73 from pipe 1 to the lower end of cylinder 66 moves piston 67 upwardly thereby opening drain passage 70. There is always a lower pressure in chamber 66 if flow is passing through the valve 3 but the exposed area of valve 68 is proportioned to overcome the pressure difference until the flow exceeds normal and the pressure difference on the two sides of piston 67 is large enough to lift valve 68. This operation will release pressure in the right hand end of cylinder 55 as by pipe 62 and allow pressure in the left hand end of cylinder 55 to move piston 56 over against stem 61. Due to throttle valve 60 full pressure is maintained in lines 57' and 58 in spite of the drop in pressure in pipes 59, 62 and chamber 63 so that piston 56 will move to the right as soon as pressure is lowered in chamber 63. Upon movement of piston 56, valves 36 and 44 will be rotated through 90° and thereby communication will be had between pipes 34 and 41; 35 and 43; and 43 and 50. This allows discharge of water from cylinder chamber 31 as by pipe 35, valve passage 48, pipe 43, valve passage 49 and pipe 50. Actuating fluid to cylinder chamber 40 will, however, be maintained as by pipe 34, valve passage 47, and pipe 41 thereby allowing piston 17 to be moved in a right hand direction and accordingly close valve 7.

When conditions are restored so as to permit normal flow through the system, pressures in each end of cylinder 66 can again be restored to that which is necessary for closing of drain passage 70, by restoring pressure in pipe 2 to equal the pressure in pipe 1. Pressure will thus be built up within the right hand end of cylinder 55 until it is the same on both sides of throttle valve 60 whereupon due to the differential pressure areas of piston 56 the latter will be moved in a left hand direction to the position shown in Fig. 1. This will again connect pipes 34 and 35 as by valve passage 47 and accordingly allow pressure to be transmitted from pipe 1 to cylinder chamber 31 and due to the differential areas of piston 17 the latter will be moved in a left hand direction to reopen plunger valve 7 and allow fluid flow from pipe 1 to pipe 2. It will be noted that the valve 5 in Fig. 1 is shown with an inlet pipe 1 larger than the outlet pipe 2. A venturi may be disposed in the pipe 2 if the difference in size between pipes 1 and 2 is not sufficient in which case pipe 71 is connected to the reduced portion of the venturi. The pressures transmitted by pipes 73 and 71 is different by the amount of the difference in velocity head at the points where these pipes are connected. This difference is related to the exposed area of valve 68 the proportions being properly worked out to cause the lifting of valve 68 when the velocity exceeds a certain predetermined value.

An alternative method of automatically closing plunger 7 is to open the normally closed valve 27b disposed in line 27a, which allows communication between pipe 27 and chamber 64, and to close the normally open valve 62a. The piston cylinder element 55 will thereby be entirely eliminated. The lifting up of valve 68 will thus discharge pressure from chamber 9 and cause closure of plunger 7. For instance, when pressure is maintained in pipe 1 and the pressure in pipe 2 drops, valve 68 will open and drain chambers 9 and 31 at a faster rate than the fluid can flow thereto through throttle valve 37 from pipe 1, thereby permitting such pressure as exists in pipe 2 to move piston 17 and close the pilot valve on stem 14. The supply of pressure to chamber A through pipes 20, 23 and 10 will then close the valve. When pressure is restored in pipe 2 piston 17 will be moved to the left and open the plunger pilot valve, whereby pressure transmitted from the annular passageway through the usual clearance space around the front plunger bearing and to chamber 9 will open the plunger.

If it should be desirable to install the plunger valve in a system which might require moving of the plunger toward closed position automatically when velocity flow in the downstream pipe became too great and to move the valve toward open position automatically when conditions were such that normal velocity could be had, the valve 62a could be opened and valve 27b closed. The cylinder 55 and associated controls could then effect such an operation. The various systems can be simultaneously in an operative condition without interfering with each other. This could be accomplished by leaving both valves 27b and 62a open.

If power supply to the pump motor should not fail thereby permitting blow off valve 29 to remain closed and should a break occur in line 1, the plunger valve would close automatically for the break would cause a high reverse flow velocity in pipe 2 in order to keep pipe 1 filled. Accordingly a low pressure would be transmitted through pipe 71 to the upper end of cylinder 66 and a higher pressure transmitted from pipe 1 through pipe 73 to cylinder 66, thereby opening valve 68. The method of plunger valve closing will depend upon whether the pipe 27a or automatic means including cylinder 55 is used.

To control the plunger valve 7 for throttling purposes mechanism is provided cooperating with the plunger controlling motor 18. This mechanism comprises as shown in Fig. 6 a hollow tube 74 disposed within a piston rod bore 16a and having an enlarged end 74a provided with radial ports 74b. The end 74a has a close sliding fit with the bore so that ports 74b may be closed by the piston 17. By providing the enlarged end a relatively small amount of friction will be created during relative movement between the piston 17 and tube 74. The outer end of tube 74 is threaded to receive a cooperating beveled gear 75 which is journaled in a suitable stationary bracket 76 and meshes with a suitably operated beveled gear 77 also journaled in the bracket 76.

In operation of the throttling control mechanism assume it is desired to have the plunger valve held in mid-position. The operator will shift the tube 74 as by the beveled gears 75 and 77 in a right hand direction to uncover ports 74b. Fluid will then be discharged from chamber 31 and the constant pressure acting in chamber 40 will move piston 17 in a right hand direction until the ports 74b are again closed by the piston. Fluid from chamber 31 can no longer be discharged and accordingly the piston will be held stationary, as will also the plunger valve 7 which has been moved by the piston to its predetermined position. If for any reason the piston 17 should be moved from its predetermined position to open the plunger valve, the latter will be automatically restored to its predetermined throttling position for the reason that the ports 74b will remain in their predetermined position. The ports 74b might during operation remain slightly open to cause pressure in chamber 31 to be slightly less than pressure in chamber 40, thereby overcoming the effect of the differential piston areas. However, the amount of opening of ports 74b would be very slight due to the throttle valve 37.

In the modified form of the throttling control mechanism shown in Fig. 7 a discharge tube 78, adjusted as by beveled gearing and threaded connections 79 similar to the gearing 75 and 77, has a port 78a and radial ports 78b, which are controlled by the outer end of a stem 17a projecting rearwardly from the piston 17. The cylinder 18 is provided with an enlarged hollow extension 18a to house suitably the member 78. This form of the throttling control mechanism permits a solid piston rod 16 among other advantages. In operations by longitudinal adjustment of the tube 78 the ports 78b may be given a predetermined position and the discharge of fluid from chamber 31 controlled in accordance therewith. If desired, the end of rod 17a may be slightly beveled to permit easy entrance within the tube 78 or a guiding extension could be formed on the end of the member 17a. To provide a limited number of set throttling positions a series of axially spaced valve controlled discharge ports could be provided in the cylinder 18. The piston 17 would not then move beyond the selected opened port.

The discharge tubes may be moved in right hand direction a sufficient distance so that the radial ports can not be uncovered by piston 17 or rod 17a, and similarly all of the axially spaced discharge ports could be closed. The result would be that the throttling control function is entirely omitted but nevertheless the remaining controlling mechanisms may function completely.

In the modified form of the invention shown in Fig. 2 a pivot valve 80 is disposed in the pipe line 81 and provided with an actuating arm 82 which is connected to a piston rod 83 that carries a piston 84. A cylinder 85 within which the piston 84 is disposed has communication with a four-way valve mechanism 86 as by pipes 87 and 88 while the valve mechanism 86 has communication with the upstream side of the pipe line 81 as by a pipe 89 and a valve controlled pipe 90. Communicating with the pipe 89 is a valve controlled auxiliary pressure supply pipe 91 while a throttle valve 92 is disposed in the pipe 89. A blow off valve 93 is disposed in pipe 94 which has communication with pipe 88 while a valve mechanism 95 is interposed between a pipe 96 leading to valve mechanism 86 and a pipe 97 leading to the downstream side of the pipe 81. A valve 98 is disposed in the pipe 97. A discharge pipe 99 has communication with the valve 95. The valve 86 is provided with passages 100 and 101 while the valve 95 has a single passage 102.

In the operation of this form of the device when the flow is interrupted as by the loss of electric power, the blow off valve 93 is opened for example by a solenoid, and pressure in the right hand end of the cylinder 85 will drop. Accordingly pressure existing in the downstream side of the pipe 81 will continue to be transmitted to the left hand end of said cylinder as by the pipe 97, passage 102, pipe 96, passage 101 and pipe 87 thereby moving piston 84 in a right hand direction to close the valve 80.

It will be noted that pipe 89 is provided with a Pitot tube pointing upstream where it connects to pipe 81 and a similar arrangement for pipe 97 except pointing down stream. This produces lower pressure in pipe 87 than in pipe 88 for flow in the normal direction and tends to move piston 84 toward the left. In the event that blowoff valve 93 fails to function, nevertheless valve 80 will be closed as soon as reverse flow starts for there will be produced a higher pressure in pipe 87 than in pipe 88, thus forcing piston 84 to the right.

When pressure is restored in the upstream side of pipe 81, it will be transmitted through the pipes 90, 89, passage 100 and pipe 88 to the right hand end of cylinder 85 to move piston 84 in a left hand direction thereby reopening the valve 80. During this opening operation pressure will exist on the left hand side of piston 84 but due to the effective area thereof being reduced by the piston rod 83 sufficient force will be had on the right hand side of the piston 84.

To close the valve automatically in case of a break in the downstream line a venturi 4 may be used. The general operation is similar to that of the device shown in Fig. 1, in that the valves 86 and 95 will be automatically turned through 90° as by a piston and cylinder arrangement such as shown at 55 and 56 in Fig. 1.

In Fig. 3 I have shown a further modified form wherein there is interposed between an upstream pipe 110 and a downstream pipe 111 a gate valve 112 comprising a reciprocal valve member 113 moved into a chamber 114 for open position by a piston 115 which is disposed in a cylinder 116. A rod 117 extending through the upper cylinder head is larger in area than the piston rod 118 for a reason which will appear in the description of the operation. A suitable valve control pipe 118a communicates with the upstream pipe 110 and with a suitable valve control pipe 119 which communicates with the cylinder 116 below piston 115 as by a valve mechanism 122 and pipe 123 while an auxiliary pressure supply pipe 120 has communication with pipes 118a and 119. The pipe 123 communicates with the cylinder 116 as by a series of pipes 124 spaced along the cylinder 116. The total cross sectional area of the pipes 124 is equal to the cross sectional area of the pipe 123. The pipes 124 check the closing movement of the valve 113 thereby allowing the valve to engage its seat gradually. A pipe 125 communicates with downstream pipe 111 as through valve mechanism 122, pipe 126, a valve mechanism 127, and a valve controlled pipe 128. The valve 127 is provided with a drain pipe 129 while the pipe 125 is provided with a valve 130. In the operation of this form of the device when pressure in the upstream pipe 110 drops tending to produce reversal of flow, the blow off valve 131 which has communication with the pipe 123 will release the pressure in the lower end of cylinder 116 thereby permitting piston 115 to be forced downwardly by pressure acting on the upper surface thereof which is communicated thereto from the downstream pipe 111 by pipe 128, valve passage 133, pipe 126, valve passage 134, and pipe 125. As piston 115 successively cuts off communication between cylinder 116 and the series of pipes 124 flow of fluid from the cylinder will require a greater length of time and accordingly a gradual seating of valve 113 will be had. When pressure conditions in upstream pipe 110 are restored valve 113 will open as by pressure in line 110 being transmitted to the lower end of the cylinder 116 through pipes 118a, 119, throttle valve 119a, passage 136, and pipes 123, 124. During this time line pressure will be exerted on the upper side of piston 115 by passing through pipes 128, 126 and 125, but due to the differential pressure areas on piston 115, created by the enlarged piston rod 117, the total upward force on the piston will be sufficient to open valve 113. If for any reason it is desired to open valve 113 prior to the restoration of pressure in pipe 110, fluid may be conducted to the lower end of the cylinder 116 as through the pipe 120.

In the modification shown in Fig. 4 the pipe line 140 has a pivotal valve 141 disposed therein and to which is connected a link 142 extending laterally of the pipe into a hollow member 143. To actuate the valve a motor 144 has a piston 145 pivotally connected to the link 142. To form differential pressure areas on the opposite sides of the piston 145 a piston rod 146 extending from one side of the piston is greater in area than the piston rod 147. Pipes 148 and 149 lead respectively to the upper and lower ends of the cylinder 144, to which fluid may be controlled by any suitable mechanism, such as disclosed in the prior forms. The operation of this form will be identical to that of the modification shown in Fig. 3.

It will also be apparent that the controlling valves for the main valve actuating motors could be controlled by hand entirely or by the use of a motor such as shown in Fig. 1. In connection with Fig. 1, it will also be apparent that the device provides for hand-controlled closing of the main valve even in case pressure is maintained in the upstream pipe 1. Such a mode of operation could be effected by detaching linkages 57 and manually operating the valves 36 and 44, or if the valves 36 and 44 are retained in their operative relation to the motor 55, the valve 38 could be closed by hand and by manual operation of the blow off valve pressure in the cylinder chamber 31 and valve chamber 9 would be released thereby permitting pressure on the left hand side of piston 17 to close the main valve. It will also be clear that the blowoff valves could be operated by a suitable mechanism including a solenoid and also be clear that the valves such as 36 and 44, which are operated simultaneously, could be disposed in axial alignment and operated by a single shaft and arm.

Further, the series of pipes 124 could be used in connection with the motor cylinder 18, and if desired in connection with the pipes leading to both ends of said cylinder, thereby obtaining a gradual cushioning action.

Auxiliary pressure supply through pipes 52, 91 and 120 is provided to operate the valve when there is no pressure in the main pipes.

In Fig. 5 a modified form of actuating means for the valves 36 and 44 is shown as also having embodied therein a blowoff valve. In this form the piston rod 160 will extend downwardly from a vertical cylinder 161 and be connected through suitable linkage connections to the valve operating linkage 57. Fluid is supplied to opposite sides of the piston 162 from the upstream pipe 1 as by pipes 163 and 164, both of which are provided with suitable hand controlled valves. The pipe 164 terminates adjacent chamber 165 which is adapted to have communication with a suitable drain pipe 166 when a valve 167 is opened by a weight 168 and suitable linkage connections 169. An adjustable stop 170 limits upward movement of piston 162.

In operation of this form, assuming pressure to be supplied to both sides of the piston 162 the piston will be forced downwardly due to the differential pressure areas on opposite sides thereof, thereby holding the valves 36, 44 in the position shown in Fig. 1. The pressure in the chamber 165 will hold the valve 167 in closed position but when pipe line pressure drops to a predetermined low value, weight 168 will cause opening of valve 167, thereby releasing pressure on the upper side of the piston 162 and permitting the pressure on the lower side of piston 162 to force the latter upwardly, thereby moving valves 36 and 44 to that position which will insure closure of the plunger valve. The flow area of the valve controlled passage and drain pipe 166 is sufficient to prevent pressure being built up on the upper side of the piston 162, although this flow area is not so great as to reduce the pressure on the under side of piston 162, and accordingly the piston may be moved. However, when the line pressure again reaches normal, the valve 167 will be closed and the piston 162 forced downwardly. Suitable means could be provided for limiting downward movement of the valve 167, such as a stop abutting the linkage 169.

The several hand and throttle valves shown are identical in construction so that any one of said valves may if desired be adjusted for throttling, closure, or open functions. The valves preferably adjusted for throttling purposes are indicated, for sake of convenience, by a square.

The plunger is actuated primarily by static fluid pressure in distinction to the operation of flap valves or the like, wherein the valves ride on the flow and are opened or closed due to the velocity of the stream impinging directly on the flap valve. In the case of reverse flow in downstream pipe 2 velocity head will be transformed into pressure head within chamber A and it is this pressure head which in certain operations directly moves the valve rather than the velocity head.

I claim:

1. The combination with a valve mechanism interposed between up and downstream pipes, said valve mechanism comprising inner and outer casings spaced to form a smooth fluid passageway therebetween, and a movable plunger having telescopic relation with respect to the inner casing, of means for controlling said plunger, including piston and cylinder elements separate from said plunger but mechanically connected thereto, and means whereby one of said elements is moved by fluid pressure so as to close the plunger automatically when fluid pressure in the upstream pipe drops.

2. The combination with a valve mechanism interposed between up and downstream pipes, said valve comprising inner and outer stationary casings spaced to form a smooth fluid passage co-axial with the pipe line axis, a plunger slidably supported by the inner casing, a fluid chamber formed by said inner casing and plunger whereby fluid pressure therein may effect a closing plunger force, a control valve mechanism disposed within said plunger and adapted to be moved relative thereto, of means for controlling plunger movement, including piston and cylinder elements separate from said plunger, means for mechanically connecting said elements to the control valve mechanism carried by said plunger, and means for controlling movement of one of said elements automatically in accordance with pressure variations in the pipe line.

3. The combination with a valve mechanism interposed between up and downstream pipes, said valve comprising inner and outer stationary casings spaced to form a smooth fluid passage co-axial with the pipe line axis, a plunger slidably supported by the inner casing, a fluid chamber formed by said inner casing and plunger whereby fluid pressure therein may effect a closing plunger force, and a control valve mechanism disposed within said plunger and adapted to be moved relative thereto, of means for controlling plunger movement, including piston and cylinder elements separate from said plunger, means for mechanically connecting one of said elements to the control valve mechanism associated with said plunger, and means for controlling movement of said connected element automatically in accordance with pressure variations in the pipe line, said piston having differential areas one of which is adapted to be constantly subjected to pressure in the downstream pipe, and the other to pressure in the upstream pipe, whereby when pressures in said up and down stream pipes vary from normal said piston will close the control valve associated with the plunger, thereby allowing fluid pressure in said chamber to move the plunger in a closing direction.

4. The combination with a valve mechanism interposed between up and downstream pipes, said valve mechanism comprising inner and outer casings spaced to form a relatively smooth annular fluid passage therebetween, said outer casing having a tapered outlet, a plunger adapted to seat against said tapered end and movably supported by one of said casings, means whereby said supporting casing and plunger form a plurality of operating chambers, and a control valve associated with the plunger whereby fluid may flow into one of said chambers upon reverse fluid flow in the downstream pipe, thereby to close the plunger, of means for further controlling said plunger comprising piston and cylinder elements, means for allowing communication between the opposite ends of said cylinder and the up and downstream pipes, and means for connecting one of said elements to said controlling valve, whereby when pressure drops in the upstream pipe said controlling valve will be closed and the plunger moved toward closing position.

5. The combination with a valve mechanism interposed between up and downstream pipes, said mechanism comprising inner and outer casings spaced to form a substantially smooth annular fluid passage therebetween, a plunger movably supported by said inner casing and adapted to form an inner chamber therebetween, of primary means for closing said plunger automatically in accordance with pressure variations in the pipe line, including piston and cylinder elements separate from but mechanically connected to the plunger, piping connecting the cylinder to the up and downstream pipes, and a secondary controlling system for said plunger, including means for reversing the pipe connections leading from said cylinder element to said up and downstream pipes.

6. The combination with a valve mechanism interposed between up and downstream pipes, said mechanism comprising inner and outer casings spaced to form a substantially smooth annular fluid passage therebetween, a plunger movably supported by said inner casing and adapted to form an inner chamber therebetween, of primary means for closing said plunger automatically in accordance with pressure variations in the pipe line, including piston and cylinder elements separate from but mechanically connected to the plunger, piping connecting the cylinder to the up and downstream pipes, and a secondary controlling system for said plunger, including means for reversing the pipe connections leading from said cylinder element to said up and downstream pipes and means rendered operative in accordance with flow velocities.

7. The combination with a valve mechanism interposed between up and downstream pipes, said valve mechanism comprising inner and outer casings spaced to form a substantially smooth annular passage co-axial with the pipe line axis, and a plunger having telescopic relation to said inner casing, of means for controlling the opening and closing of said plunger, including one system adapted to be rendered operative in accordance with increase or decrease of pressure in the upstream pipe, and a second system adapted to be rendered operative in accordance with velocity flow in the downstream pipe, said second system including the first system as a part thereof.

8. The combination with a valve mechanism interposed between up and downstream pipes, said mechanism comprising inner and outer casings spaced to form a substantially smooth annular passageway which is substantially co-axial with the pipe line axis, a plunger having telescopic relation with one of said casings forming a fluid chamber therebetween, of three systems for controlling plunger movement, one of said systems constituting a unit adapted for independent operation, another system including said unit as a part thereof, while the third system is adapted to cooperate with both of said other systems.

9. The combination with a valve mechanism interposed between up and downstream pipes, said mechanism comprising inner and outer casings spaced to form a substantially smooth annular passageway which is substantially co-axial with the pipe line axis, a plunger having telescopic relation with one of said casings and forming a fluid chamber therebetween, of three systems for controlling plunger movement, one of said systems constituting a unit adapted for independent operation, another system including said unit as a part thereof, while the third system is adapted to cooperate with both of said other systems, and means whereby when said third system is rendered operative a part of the second system may be rendered inoperative.

10. The combination with a valve mechanism interposed between up and downstream pipes, said mechanism comprising inner and outer casings spaced to form a substantially smooth annular passageway which is substantially co-axial with the pipe line axis, a plunger having telescopic relation with one of said casings forming a fluid chamber therebetween, of three systems for controlling plunger movement, one of said systems constituting a unit adapted for independent operation, another system including said unit as a part thereof, while the third system is adapted to cooperate with both of said other systems, certain of said systems including fluid operated elements, fluid passages communicating therewith, and throttle valves disposed in certain of said passages whereby when pressure is released in certain parts of said systems said fluid operated elements will be moved to effect opening or closing of the plunger.

11. The combination with a valve mechanism interposed between up and downstream pipes, said mechanism having a movable valve element, of means for moving said valve element to closed and open positions by fluid pressure, including a cylinder and piston, said piston having differential fluid pressure areas, the smaller one of which is for closing and the larger one for opening said valve, and means including a blow-off valve adapted to be opened upon decrease of pressure in the upstream pipe whereby the fluid pressure acting upon said larger area is adapted to be decreased automatically in accordance with a drop in pressure in the upstream pipe, thereby to permit said valve to be closed.

12. The combination with a valve mechanism interposed between up and downstream pipes, said mechanism having a movable valve element, of means for moving said valve element to closed and open positions by fluid pressure, including a cylinder and piston, said piston having differential fluid pressure areas, the smaller one of which is for closing and the larger one for opening said valve, and means including a control pipe for allowing communication between the upstream pipe and said cylinder, and a blow-off valve having communication with said control pipe and adapted to be opened upon decrease of pressure in the upstream pipe, whereby the fluid pressure acting upon said larger area is adapted to be decreased automatically in accordance with a drop in pressure in the upstream pipe, thereby to permit said valve to be closed.

13. The combination with a valve mechanism interposed between up and downstream pipes, said mechanism having a movable valve element, of means for moving said valve element to closed and open positions by fluid pressure, including a cylinder and piston, said piston having differential fluid pressure areas, the smaller one of which is for closing and the larger one for opening said valve, and means including a control pipe for allowing communication between the downstream pipe and said cylinder, and a blow-off valve adapted to be opened upon decrease of pressure in the upstream pipe, whereby the fluid pressure acting upon said larger area is adapted to be decreased automatically in accordance with a drop in pressure in the upstream pipe, thereby to permit said valve to be closed.

14. The combination with a valve mechanism interposed between up and downstream pipes, said mechanism having a movable valve element, of means for moving said valve element to closed and open positions by fluid pressure, including a cylinder and piston, said piston having differential fluid pressure areas, the smaller one of which is for closing and the larger one for opening said valve, and means including a plurality of control pipes certain of which allow communication between said downstream pipe and said cylinder and the remainder of which allow communication between the upstream pipe and said cylinder, and a blow-off valve adapted to be opened upon decrease of pressure in the upstream pipes, whereby the fluid pressure acting upon said larger area is adapted to be decreased automatically in accordance with a drop in pressure in the upstream pipe, thereby to permit said valve to be closed.

15. A valve mechanism as set forth in claim 11 wherein said automatic means includes a plurality of control pipes, certain of which allow communication between said downstream pipe and said cylinder, and the remainder of which allow communication between the upstream pipe and said cylinder, and valve mechanism associated with said control pipes whereby the pressure communications from said up and downstream pipes to said cylinder may be reversed.

16. The combination with a valve mechanism interposed between up and downstream pipes of a pipe line, said mechanism having a movable valve element, of means for moving said valve element to its opening and closing positions by fluid pressure, a blow-off valve having fluid connection with said pipe line whereby the blow-off valve is adapted to be opened automatically upon a drop of pressure in the upstream pipe, and means whereby said blow-off valve controls said fluid pressure means to close the pipe line valve mechanism automatically upon said drop in upstream pressure.

17. The combination with a valve mechanism interposed between up and downstream pipes of a pipe line, said mechanism having a movable valve element, of means for moving said valve element to its opening and closing positions by fluid pressure, a blow-off valve having fluid connection with said pipe line whereby the blow-off valve is adapted to be opened automatically upon a drop of pressure in the upstream pipe, and means whereby said blow-off valve controls said fluid pressure means to close the pipe line valve mechanism automatically upon said drop in upstream pressure and also to close the pipe line valve automatically upon a drop in downstream pressure.

18. The combination in a valve mechanism interposed between up and downstream pipes, said mechanism having a movable valve element, means for moving said valve element to its opening and closing positions by fluid pressure, including a cylinder and a piston which has differential fluid pressure areas, means for supplying fluid pressure to each side of said piston, and a blow-off valve adapted to be opened automatically upon a drop of pressure in the upstream pipe and being associated with the supply means which leads to the end of said cylinder containing the larger of said piston areas whereby said blow-off valve controls said fluid pressure means by decreasing the fluid pressure on the larger area of said piston so that the pressure acting on the smaller area causes said valve to be closed automatically upon said drop of the upstream pressure.

19. A valve mechanism as set forth in claim 18 further characterized in that said means for supplying fluid pressure to the smaller of said piston areas is adapted to be open at all times, whereby when said upstream pressure is restored and fluid pressure allowed to accumulate in the end of said cylinder containing the larger piston area, said pipe line valve will be opened even during simultaneous existence of fluid pressure on the smaller of said piston area.

20. The combination in a valve mechanism interposed between up and downstream pipes, said mechanism having a movable valve element, means for moving said valve element to its opening and closing positions by fluid pressure including a cylinder and piston therein having differential fluid pressure areas, means for supplying fluid to the end of said cylinder containing the smaller of said piston areas, means allowing communication between the upstream pipe and the end of said cylinder containing the larger of said piston areas, a blow-off valve adapted to be opened automatically upon a drop of pressure in the upstream pipe, and means whereby said blow-off valve controls said fluid pressure means so as to permit discharge of fluid from said cylinder, thereby to effect closure of the pipe line valve automatically upon said drop of the upstream pressure.

21. The combination with a valve mechanism interposed between up and downstream pipes, of a motor having a piston for moving said valve to closed and open positions, said piston having differential pressure areas, means for subjecting one of said areas to pressure conditions existing on one side of said valve mechanism, means for subjecting the other side of said piston to pressure conditions existing on the other side of said valve mechanism, and means whereby the pressure conditions on the opposite sides of said piston may be reversed automatically in accordance with pressure conditions in said pipes.

22. The combination with a valve mechanism interposed between up and downstream pipes, of a motor having a piston for moving said valve to closed and open positions, said piston having differential pressure areas, means for subjecting one of said areas to pressure conditions existing on one side of said valve mechanism, means for subjecting the other side of said piston to pressure conditions existing on the other side of said valve mechanism, and means including a motor controlled valve mechanism whereby the pressure conditions on the opposite sides of said piston may be reversed automatically in accordance with pressure conditions in said pipes.

23. The combination with a valve mechanism having inner and outer casings spaced to form a smooth fluid passage therebetween, a movable plunger carried by the inner casing, said valve mechanism being interposed between up and downstream pipes within which normal pressure differences have a substantially predetermined relation, of means for closing said valve when a different pressure relation exists and for automatically opening said valve when said relation is substantially normal, including a reversible valve actuating motor, and means for controlling one direction of movement thereof to effect valve opening by the pressure existing in said upstream pipe.

24. The combination with a valve mechanism, interposed between up and downstream pipes, having a movable valve member and means cooperating therewith to form a chamber for receiving fluid pressure which creates an operating force upon said valve, of a cylinder and piston forming a fluid pressure valve operating chamber, said piston being spaced from said valve member but operatively connected thereto, and means for controlling fluid pressure for operating said valve member, whereby said valve is automatically closed when pressure drops in the upstream pipe.

25. The combination with a valve mechanism, interposed between up and downstream pipes, having a movable valve member and means cooperating therewith to form a chamber for receiving fluid pressure which creates an operating force upon said valve, of a cylinder and piston operatively connected to said valve member one end of said cylinder forming a fluid pressure valve operating chamber, and means whereby the cylinder chamber has communication with the upstream pipe, thereby to permit cylinder pressure to drop automatically in accordance with drop of fluid pressure in the upstream pipe.

26. The combination with a valve mechanism, interposed between up and downstream pipes, having a movable valve member and means cooperating therewith to form a chamber for receiving fluid pressure which creates an operating force upon said valve, of a cylinder and piston operatively conected to said valve member, said cylinder having closed fluid chambers at opposite ends thereof, and means for supplying fluid to said chambers, whereby when pressure drops in said upstream pipe, said valve member will automatically close.

27. The combination with a valve mechanism, interposed between up and downstream pipes, having a movable valve member and means cooperating therewith to form a chamber for receiving fluid pressure which creates an operating force upon said valve, of a cylinder and piston operatively connected to said valve member, said cylinder having closed fluid chambers at opposite ends thereof, and means for supplying fluid to said chambers, whereby said valve member, when closed, will automatically open when pressure in the upstream pipe is increased to a predetermined value.

28. The combination with a valve mechanism, interposed between up and downstream pipes, having a movable valve member and means cooperating therewith to form a chamber for receiving fluid pressure which creates an operating force upon said valve, of a cylinder and piston operatively connected to said valve member, said cylinder having closed fluid chambers at opposite ends thereof, and means allowing communication between said cylinder chambers and said up and downstream pipes, whereby said piston is moved automatically in accordance with pressure variations in said pipe-line, thereby to control fluid pressure in said valve chamber.

29. The combination with a valve mechanism, interposed between up and downstream pipes, having a movable valve member and means cooperating therewith to form a chamber for receiving fluid pressure which creates an operating force upon said valve, of a cylinder and piston operatively connected to said valve member, said cylinder having closed fluid chambers at opposite ends thereof, and means allowing communication between said cylinder chambers and said up and downstream pipes, said communicating means normally and continuously supplying fluid from one of said pipes to one of said cylinder chambers whereas the fluid pressure in the other cylinder chamber is adapted for variation in accordance with the pipe line pressure variations whereby said piston is moved automatically in accordance with pressure variations in said pipe-line, thereby to control fluid pressure in said valve chamber.

30. The combination with a valve mechanism, interposed between up and downstream pipes, having a movable valve member and means cooperating therewith to form a fluid pressure operating chamber, of means for controlling said valve member, comprising a cylinder and a piston therein, said cylinder having a closed chamber at each end thereof, and means for controlling the fluid pressure therein whereby when the pressure drops in said downstream pipe, said valve member will close automatically.

31. The combination with a valve mechanism, interposed between up and downstream pipes, having a movable valve member and a hollow internal casing cooperating therewith to form a fluid pressure operating chamber, of means for controlling said valve member, comprising a cylinder and a piston therein, said cylinder having a closed chamber at each end thereof, and means for controlling the fluid pressure therein whereby when the pressure drops in said downstream pipe, said valve member will close automatically.

32. The combination with a valve mechanism, interposed between up and downstream pipes, having a movable valve member and means cooperating therewith to form a fluid pressure operating chamber, of means for controlling said valve member, comprising a cylinder and a piston therein, said cylinder having a closed chamber at each end thereof, and means for controlling the fluid pressure therein whereby when the pressure drops in said downstream pipe said valve member will close automatically, and when downstream pressure is restored said valve mechanism will be opened automatically.

33. The combination with a hydraulic valve mechanism, interposed between up and downstream hydraulic pipes, having a movable valve member and a casing therefor arranged to provide a smooth fluid passageway when the valve member is in an open position, of means for moving said valve member in opposite directions by static fluid pressure, including valve operating pressure chambers spaced from the fluid-way in said pipes, and means whereby when pressure drops in either the up or downstream pipe said valve member is automatically closed.

34. The combination with a hydraulic valve mechanism, interposed between up and downstream hydraulic pipes, having a movable valve member and a casing therefor arranged to provide a smooth fluid passageway when the valve member is in an open position, of means for moving said valve member in opposite directions by static fluid pressure including valve operating pressure chambers spaced from the fluid-way in said pipes, means whereby when pressure drops in either the up or downstream pipe said valve member is automatically closed, and means for opening said valve member automatically when pressure is restored in the respective pipe where the pressure drop occurred.

35. The combination with a hydraulic valve mechanism, interposed between up and downstream hydraulic pipes, having a movable valve member and a casing therefor arranged to provide a smooth fluid passageway when the valve member is in an open position, of means for moving said valve member in opposite directions by static fluid pressure including valve operating pressure chambers spaced from the fluid-way in said pipes, means whereby when pressure drops in either the up or downstream pipe said valve member is automatically closed, and means for opening said valve member automatically when pressure is restored in the respective pipe-line where the pressure drop occurred, said latter means comprising an operating motor spaced from but operatively connected to said valve member, means for controlling power supply therefor, and a second motor for also controlling said power supply, said second motor being controlled in accordance with pressure variations in the downstream pipe.

36. The combination with a hydraulic valve mechanism, interposed between up and downstream hydraulic pipes, having a movable valve member and a casing therefor arranged to provide a smooth fluid passageway when the valve member is in an open position, of means for moving said valve member in opposite directions by static fluid pressure including valve operating pressure chambers spaced from the fluid-way in said pipes, means whereby when pressure drops in either the up or downstream pipe said valve member is automatically closed, and means for opening said valve member automatically when pressure is restored in the respective pipe-line where the pressure drop occurred, said latter means comprising an operating motor spaced from but operatively connected to said valve member, means for controlling power supply therefor, and a second motor for also controlling said power supply, said second motor being controlled in accordance with pressure variations in the downstream pipe, and said operating motor being controlled both in accordance with pressure variations in the upstream pipe and in accordance with the operation of said second motor.

37. The combination with a valve mechanism interposed between up and downstream pipes of a flow conduit and having a movable valve member, of means for controlling said valve member in accordance with flow conditions in said conduit, including a plurality of cylinder and piston motors, spaced from said valve but one of which is adapted to actuate said valve, both ends of each cylinder being closed while the pistons in each of said cylinders have differential fluid pressure areas.

38. The combination with a valve mechanism interposed between up and downstream pipes of a flow conduit and having a movable valve member, of means for controlling said valve member in accordance with flow conditions in said conduit including a plurality of cylinder and piston motors each spaced from said valve by being disposed on the outside thereof and both motors being operatively associated with said valve member while one of the motors is adapted to actuate said valve, both ends of each cylinder being closed while the pistons in each of said cylinders have differential fluid pressure areas.

39. The combination with a valve mechanism interposed between up and downstream pipes having a movable valve member and means cooperating therewith to form a fluid valve operating chamber, and said valve member moving substantially coaxially of both of said pipes which connect into said valve mechanism in substantially coaxial relation therewith, of means for controlling said valve member, including piston and cylinder elements mechanically operatively connected thereto, and means whereby one of said elements is moved by fluid pressure so as to close the valve member automatically when fluid pressure in the upstream pipe drops.

40. In combination with a fluid operated plunger valve, of power controlled means for moving said valve to a predetermined throttling position, including means adapted to have a set position in advance of said valve reaching said throttling position, and to control the actuating power automatically when the throttled position is reached.

41. In combination with a fluid operated plunger valve, of means for effecting a predetermined throttling position thereof by fluid pressure, including means adapted to have a set position in advance of said valve reaching said throttling position and to control the pressure automatically when said position is reached.

42. In combination with a fluid controlled plunger valve, of means for effecting a throttling position thereof, including piston and cylinder elements, and means for effecting a predetermined position between said piston and cylinder elements by permitting escape of piston actuating fluid from said cylinder when said position has been reached.

43. In combination with a fluid controlled valve, of means for effecting a throttling position thereof, including piston and cylinder elements, means adapted to have a set position in advance of valve movement for automatically limiting the volume of fluid that can be contained in said cylinder element when said position is reached, and means for variably controlling said latter means whereby a different volume may be obtained.

44. In combination with a valve, of means for effecting a predetermined throttling position thereof, including relatively movable piston and cylinder elements, and means providing ports adapted to be immovable during valve movement and to be closed automatically upon predetermined relative movement between said elements.

45. In combination with a valve, of means for effecting a predetermined throttling position thereof, including piston and cylinder elements, one of which is movable, a member movable to different positions in advance of valve movement and having a port adapted to have controlled communication with the cylinder automatically when said position is reached, means movable with said movable element to control said ports, and means for effecting relative adjustment between said ports and controlling member therefor, whereby variable throttling positions may be obtained.

46. In combination with a valve interposed between up and downstream pipes, of means for closing the valve when pressure drops in the upstream pipe which is substantially unrestricted, means for atomatically opening the valve when pressure is restored, and means having a fluid pressure controlling port cooperating with said opening means for effecting a throttling position of said valve.

47. In combination with a valve interposed between up and downstream pipes, of means for closing the valve when pressure drops in the upstream pipe which is substantially unrestricted, means for automatically opening the valve when pressure is restored, means having a fluid pressure controlling port cooperating with said opening means for effecting a throttling position of said valve, and means for variably controlling said port means whereby any throttling position may be obtained.

48. In combination with a throttling valve disposed in a pipe line, of means for automatically opening the valve when a substantially predetermined pressure condition exists in said line, and means having a fluid pressure controlling port for controlling the throttling position of said valve, said controlling means constituting an auxiliary part of the automatic means.

49. In combination with a throttling valve disposed in a pipe line, of means for automatically opening the valve when a substantially predetermined pressure condition exists in said line, and means having a fluid pressure controlling port for variably controlling the throttling position of said valve, said automatic and throttling means being adapted to be simultaneously in an operative condition, whereby when said throttling means is varied the opening means is operated by pressure conditions existent prior to varying the control.

50. The combination of a hydraulically operated valve mechanism interposed between up and downstream pipes of a hydraulic conduit, said valve having a movable valve element, means forming fluid pressure chambers whereby fluid pressure forces may be exerted on said valve element in opening and closing directions, fluid pressure connections leading to each of said chambers, and means for controlling the fluid pressure in said chambers automatically in accordance with drop in pressure in said upstream pipe including a hydraulically operated valve for controlling said chamber pressure and fluid pressure connections leading from said up and downstream pipes to said latter valve to effect actuation thereof in accordance with reverse flow in said conduit thereby effecting closure of the conduit valve.

51. The combination of a main, a valve in said main, cylinder and piston mechanism for actuating the valve, connections from the main to the cylinder for manually controlling the movement of the piston by means of fluid from the main and means for automatically admitting water from the main to the cylinder to close the valve when the flow in the main is reduced to a predetermined amount.

OTTO V. KRUSE.